United States Patent
Suzuki (10) Patent No.: US 7,206,612 B2
(45) Date of Patent: Apr. 17, 2007

(54) INFORMATION PROCESSING SYSTEM, INFORMATION PROCESSING APPARATUS AND METHOD, PROGRAM STORAGE MEDIUM, AND TELEPHONE SET

(75) Inventor: Naoya Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 552 days.

(21) Appl. No.: 09/775,738

(22) Filed: Feb. 2, 2001

(65) Prior Publication Data

US 2001/0027098 A1    Oct. 4, 2001

(30) Foreign Application Priority Data

Feb. 4, 2000    (JP)    .............................. 2000-032814

(51) Int. Cl.
*H04B 1/38*    (2006.01)

(52) U.S. Cl. ...................... 455/567; 455/566; 455/41.2; 379/142.06; 379/142.05; 379/142.01

(58) Field of Classification Search ................ 455/415, 455/414.1, 567; 379/142.01, 142.06, 142.05, 379/142.1, 127.01, 140, 354, 142.17, 157, 379/93.23, 88.21, 142.04; 709/201, 213
See application file for complete search history.

(56) References Cited

U.S. PATENT DOCUMENTS

| | | | | |
|---|---|---|---|---|
| 5,546,447 A | * | 8/1996 | Skarbo et al. ......... | 379/142.05 |
| 5,572,576 A | * | 11/1996 | Klausner et al. ......... | 379/88.11 |
| 6,005,927 A | * | 12/1999 | Rahrer et al. .......... | 379/142.01 |
| 6,137,871 A | * | 10/2000 | Maier et al. ........... | 379/142.06 |
| 6,169,911 B1 | * | 1/2001 | Wagner et al. .............. | 455/566 |
| 6,175,741 B1 | * | 1/2001 | Alperovich ................. | 455/458 |
| 6,324,272 B1 | * | 11/2001 | Abu-Shukhaidem et al. ..................... | 379/142.06 |
| 6,343,120 B1 | * | 1/2002 | Rhodes .................. | 379/142.01 |
| 6,353,664 B1 | * | 3/2002 | Cannon et al. .......... | 379/142.1 |
| 6,442,263 B1 | * | 8/2002 | Beaton et al. ......... | 379/142.04 |
| 6,449,475 B1 | * | 9/2002 | Chinnaswami .............. | 455/415 |
| 6,553,222 B1 | * | 4/2003 | Weiss ......................... | 455/415 |
| 6,584,490 B1 | * | 6/2003 | Schuster et al. ............ | 709/200 |
| 6,601,111 B1 | * | 7/2003 | Peacock et al. ............. | 719/310 |
| 6,611,673 B1 | * | 8/2003 | Bayley et al. .............. | 455/564 |
| 2003/0211864 A1 | * | 11/2003 | Bodnar et al. ........... | 455/556.1 |

* cited by examiner

*Primary Examiner*—Temica Beamer
*Assistant Examiner*—Joy Contee
(74) *Attorney, Agent, or Firm*—Oblon, Spivak, McClelland, Maier & Neustadt, P.C.

(57) ABSTRACT

In an information processing system, an information processing apparatus and method, a program storage medium, and a telephone set, a caller number for an incoming call to a telephone set is transmitted to an information processing apparatus, and information concerning a caller having originated the incoming call is read from storage means to be displayed, so that the user can be provided with various kinds of information concerning the caller before the user responds to the incoming call.

16 Claims, 6 Drawing Sheets

```
┌─────────────────────────────┐
│                             │
│   CALL FROM 03-****-****    │
│                             │
└─────────────────────────────┘     110

FIG. 7

┌─────────────────────────┐
│      03-****-****       │
│   CALL FROM JOHN SMITH  │
└─────────────────────────┘     111

FIG. 8

┌──────────────────────────────────────────────────────┐
│ INFORMATION ON JOHN SMITH          ┌──────────┐      │
│                                    │ DISPLAY  │──112B│
│   · IMAGE PRESENT                  │TERMINATION│     │
│   · MAIL: DEC. 15. 1999   CONSULTATION               │
│   · MAIL: DEC. 24. 1999   ....                       │
│   · TODO: JAN. 20. 2000   SUBMISSION OF MANAGEMENT REPORT │
└──────────────────────────────────────────────────────┘     112

112A = items on left

FIG. 9

JOHN SMITH

DATE: DEC. 15. 1999
FROM: JOHN SMITH
TO: PETER POWEL
SUBJECT: DELIVERY OF SAMPLE
TEXT:
THANK YOU FOR YOUR CONTINUED
PATRONAGE ...
                                         113

FIG. 10
```

INFORMATION PROCESSING SYSTEM, INFORMATION PROCESSING APPARATUS AND METHOD, PROGRAM STORAGE MEDIUM, AND TELEPHONE SET

BACKGROUND OF THE INVENTION

1. Field of the Invention

The present invention relates to an information processing system, an information processing apparatus and method, a program storage medium, and a telephone set, and more particularly, is suitably applied to an information processing system, an information processing apparatus and method, a program storage medium, and a telephone set, by means of which caller information associated with a telephone number of the caller who originated a call having arrived at a telephone set is displayed.

2. Description of the Related Art

Conventionally, in a public switched telephone network or cellular phone network, a caller notification service, by which a telephone number of a caller (herein after referred to as "caller number") is displayed at a telephone set of a receiver, has been provided.

Telephone sets utilizing a caller notification service of this type include telephone sets having an audio caller notification function for providing notification to a user by making specific ringing tone or sound registered in advance in response to an incoming call from a particular caller, or a caller information display function for displaying information associated with the caller number (for example, the name or image of the caller) on the display screen.

The telephone set having the audio caller notification function, however, has a problem that it only can allow the user to know the incoming call from a particular caller by a sound, and cannot give the user detailed information on the caller.

On the other hand, the telephone set having the caller information display function has a problem that it can only insufficiently give the user detailed information on the caller due to its limited display screen area.

SUMMARY OF THE INVENTION

In view of the foregoing, an object of this invention is to provide an information processing system, an information processing apparatus and method, a program storage medium, and a telephone set, which allow personal information on a caller to be provided to a user when the call arrives at the user.

The foregoing object and other objects of the invention have been achieved by the provision of a telephone set which transmits a caller number specific to a caller which is added to an incoming signal arriving at itself, and an information processing apparatus which receives the caller number transmitted by the telephone set, reads the personal information on the caller associated with the caller number from a storage means, and displays the information.

The caller number added to the incoming signal arriving at the telephone set is received from the telephone set, and the personal information associated with the received caller number is read from the storage means and displayed, whereby the detailed information on the caller can be provided to the user.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to accompanying drawings:

(1) Overall Configuration of Information Processing System

Figure 1:
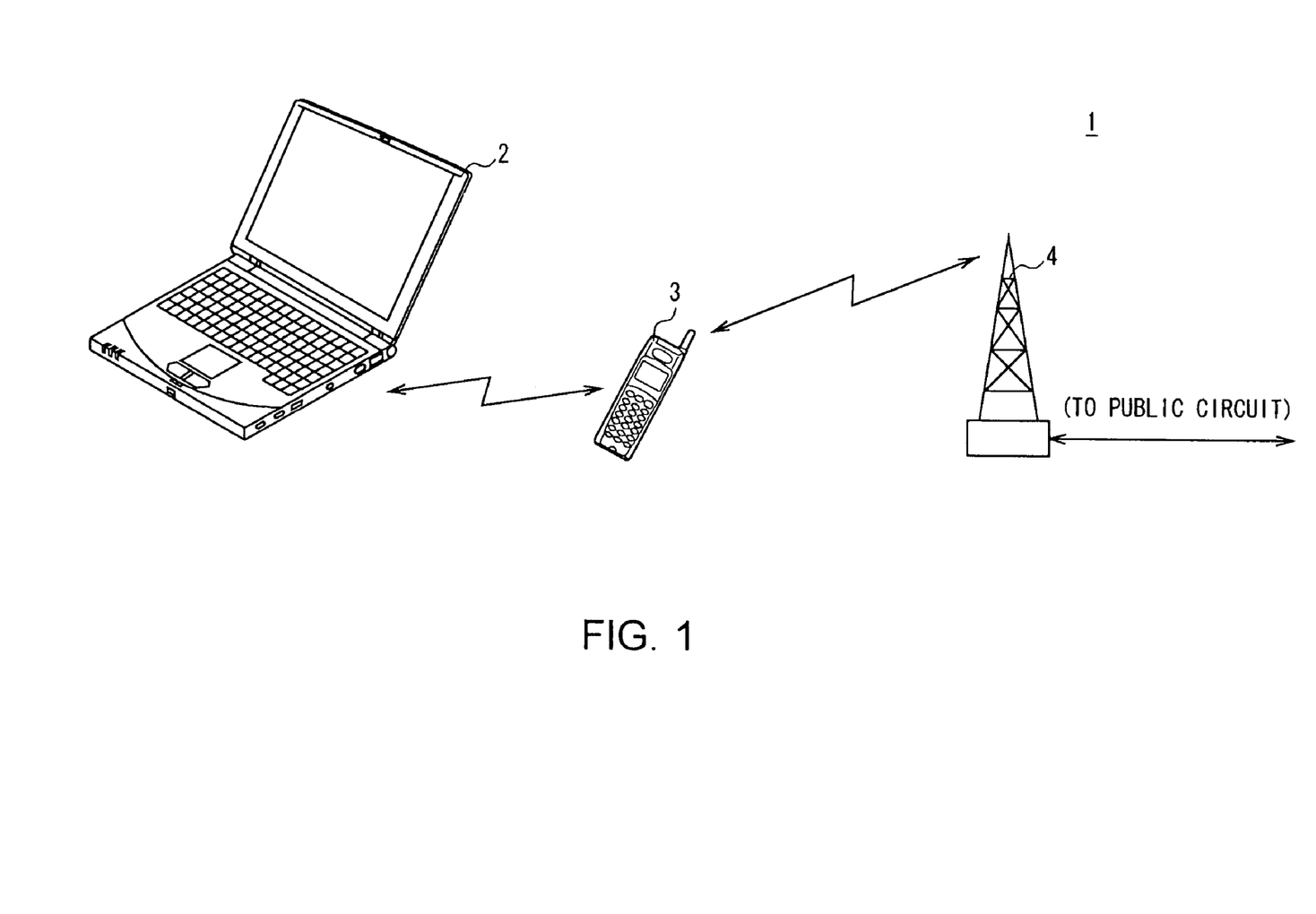
FIG. 1 is a schematic view of an overall configuration of an information processing system according to the present invention.

In FIG. 1, reference numeral 1 generally denotes an information processing system to which the present invention is applied, which is constituted by a notebook personal computer 2 (hereinafter, referred to as notebook PC), which is an information processing apparatus, and a digital cellular phone 3.

The digital cellular phone 3 is connected by wireless to a base station 4, and is adapted to conduct various types of communication, such as voice communication or data communication, with another cellular phone or wire telephone connected to a public circuit (not shown), or with various communication terminals, such as personal computer or Personal Digital Assistants (PDA) via the base station 4.

Furthermore, the notebook PC 2 and the digital cellular phone 3 can communicate with each other via wireless communication which is compliant with the Bluetooth (trademark), a wireless communication standard, whereby the notebook PC 2 can conduct various types of wireless communication with other various communication terminals connected to the public circuit via the digital cellular phone 3.

Now, the Bluetooth is a short-range wireless data communication standard which is standardized by the Bluetooth Special Internet Group (SIG), a standardization organization, and according to the Bluetooth, the spread spectrum communication system of frequency hopping type, in which 79 channels each having a bandwidth of 1 MHz are set in an industrial scientific medical (ISM) band of 2.4 GHz, and the channels are switched 1600 times a second, is adopted, and
} data is transmitted at a transmission rate of 1 Mbit/s (effective transmission rate of 721 kbit/s) and over a transmission range of 10 m.

(1-1) Configuration of Personal Computer

Figure 2:
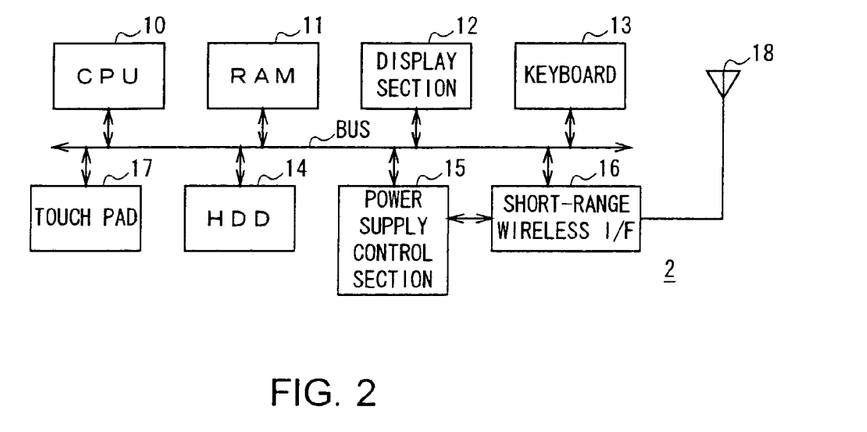
FIG. 2 is a block diagram showing a circuit configuration of a notebook personal computer.

As shown in FIG. 2, the notebook PC 2 has a configuration in which a CPU 10, a Random Access Memory (RAM) 11, a display section 12 constituted by a liquid crystal display, a keyboard 13, a hard disk drive (HDD) 14, a power supply control section 15, a short-range wireless interface 16 compliant with the Bluetooth standard, and a touch pad 17 are connected to a data bus BUS.

The HDD 14, which is storage means, stores an operating system program such as Windows 98 (Microsoft Corp., trademark), various application programs such as a caller information display program, and a personal information database.

The CPU 10 is adapted to execute various processings by reading a program stored in the HDD 14 as appropriate, and executing the program by deploying it in the RAM 11. The CPU 10 controls the respective circuit sections in the notebook PC 2 according to the processing, as well as displays the result of the processing on the display section 12.

The power supply control section 15, which controls the power supplied to respective circuit sections in the notebook PC 2, is adapted to continuously supply power to the short-range wireless interface 16 even if the notebook PC 2 is in a dormant state.

The short-range wireless interface 16, which is short-range wireless communication means, conducts wireless data communication with the digital cellular phone 3 (FIG. 1), which is Bluetooth-compliant equipment in the vicinity of the notebook PC, via an antenna 18.

In this regard, the short-range wireless interface 16 continuously operates when the notebook PC 2 is in the dormant state, and if the short-range wireless interface 16 receives an activation signal from the digital cellular phone 3 during the dormant state of the notebook PC 2, in response to the reception, it outputs an activation instruction to the power supply control section 15 to cause it to start the power supply to the respective circuit sections constituting the notebook PC 2, thereby activating the notebook PC 2.

(1-2) Configuration of Digital Cellular Phone

Figure 3:
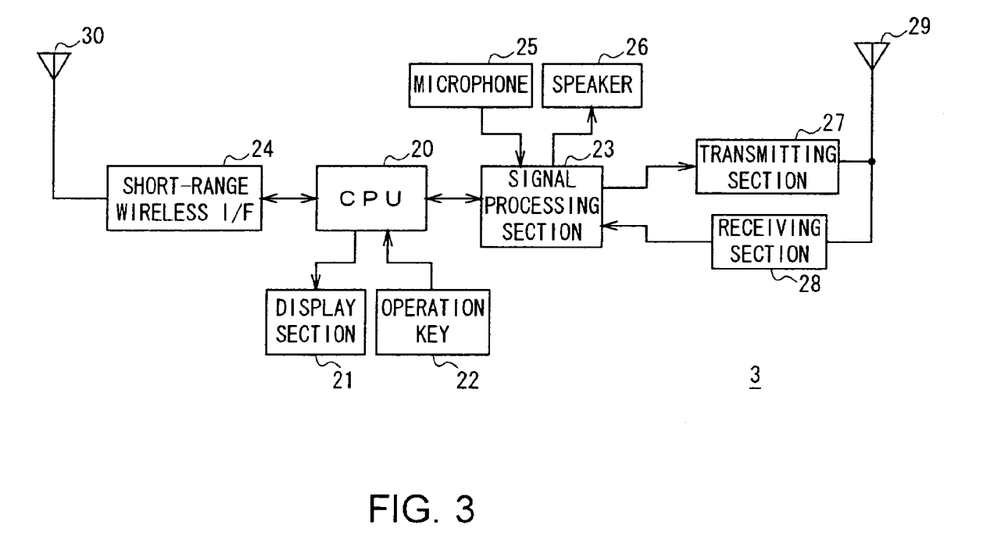
FIG. 3 is a block diagram showing a circuit configuration of a digital cellular phone.

As shown in FIG. 3, the digital cellular phone 3 has a configuration in which a display section 21 constituted by a liquid crystal display, a plurality of operation keys 22, a signal processing section 23, and a short-range wireless interface 24 compliant with the Bluetooth standard are connected to a CPU 20 which controls the whole operation of the digital cellular phone 3, and a microphone 25, a speaker 26, a transmitting section 27, and a receiving section 28 are connected to the signal processing section 23.

The CPU 20 displays on the display section 21 various kinds of information corresponding to instruction information inputted via the operation keys 22 (for example, an inputted telephone number or menu items, an origination history, a telephone directory, or the like). Furthermore, the CPU 20 controls the signal processing section 23 according to the instruction information inputted via the operation keys 22, thereby executing various kinds of processing corresponding to the instruction information, such as calling process or termination process.

Actually, the digital cellular phone 3 is a Digital Sequence (DS) Code Division Multiple Access (CDMA) cellular phone which is compliant with IS 95 standard, in which, during a telephone conservation, the signal processing section 23 generates a transmission symbol stream by sequentially implementing on the audio signal inputted from the microphone 25 error correction processing based on Cyclic Redundancy Check (CRC), convolution coding processing, multiplication by a pseudo noise (PN) code for frequency spreading, and Quadrature Phase Shift Keying (QPSK) modulation, and inputs the transmission symbol stream to the transmitting section 27. The transmitting section 27 implements digital-to-analog conversion on the transmission symbol stream to generate a transmission signal, and transmits the transmission signal via the antenna 29 after converting the frequency of the signal and amplifying it.

On the other hand, the receiving section 28 amplifies the signal received via the antenna 29 and converts the frequency thereof, then implements analog-to-digital conversion on the signal to generate a reception symbol stream, and inputs the reception symbol stream to the signal processing section 23. The signal processing section 23 generates the audio signal by sequentially implementing on the reception symbol stream QPSK demodulation, multiplication by the PN code for inverse frequency spreading, maximum likelihood sequence estimation using the convolution code, and error detection processing based on the CRC, and outputs the audio signal via the speaker 26.

In addition, the signal processing section 23 implements the calling process by transmitting the control signal to the base station 4 (FIG. 1) via the transmitting section 27 and antenna 29 under the control of the CPU 20, and receives the incoming signal via the antenna 29 and receiving section 28, and notifies the CPU 20 of the reception.

The CPU 20 controls the signal processing section 23, and implements wireless data communication with other communication terminals, which are connected to the public circuit, via the transmitting section 27, receiving section 28, and antenna 29.

Furthermore, the CPU 20 controls the short-range wireless interface 24, which is short-range wireless communication means, and implements wireless data communication with the notebook PC 2 (FIG. 1), which is Bluetooth-compliant equipment in the vicinity of the notebook PC, via the antenna 30.

Furthermore, the CPU 20 implements exchange of communication data between the signal processing section 23 and the short-range wireless interface 24, thereby allowing wireless data communication via the digital cellular phone 3 between the notebook PC 2 and other communication terminals connected to the public circuit (not shown).

(2) Caller Information Display Processing

Next, the caller information display processing in the information processing system 1 will be described.

(2-1) Processing in Digital Cellular Phone

The digital cellular phone 3 according to the present invention is adapted, if a caller number is added to the incoming signal from the public circuit, to display the caller number on the display section 21 for notifying the user of the caller number, as well as transmit the caller number to the notebook PC 2 via the short-range interface 24.

Figure 4:
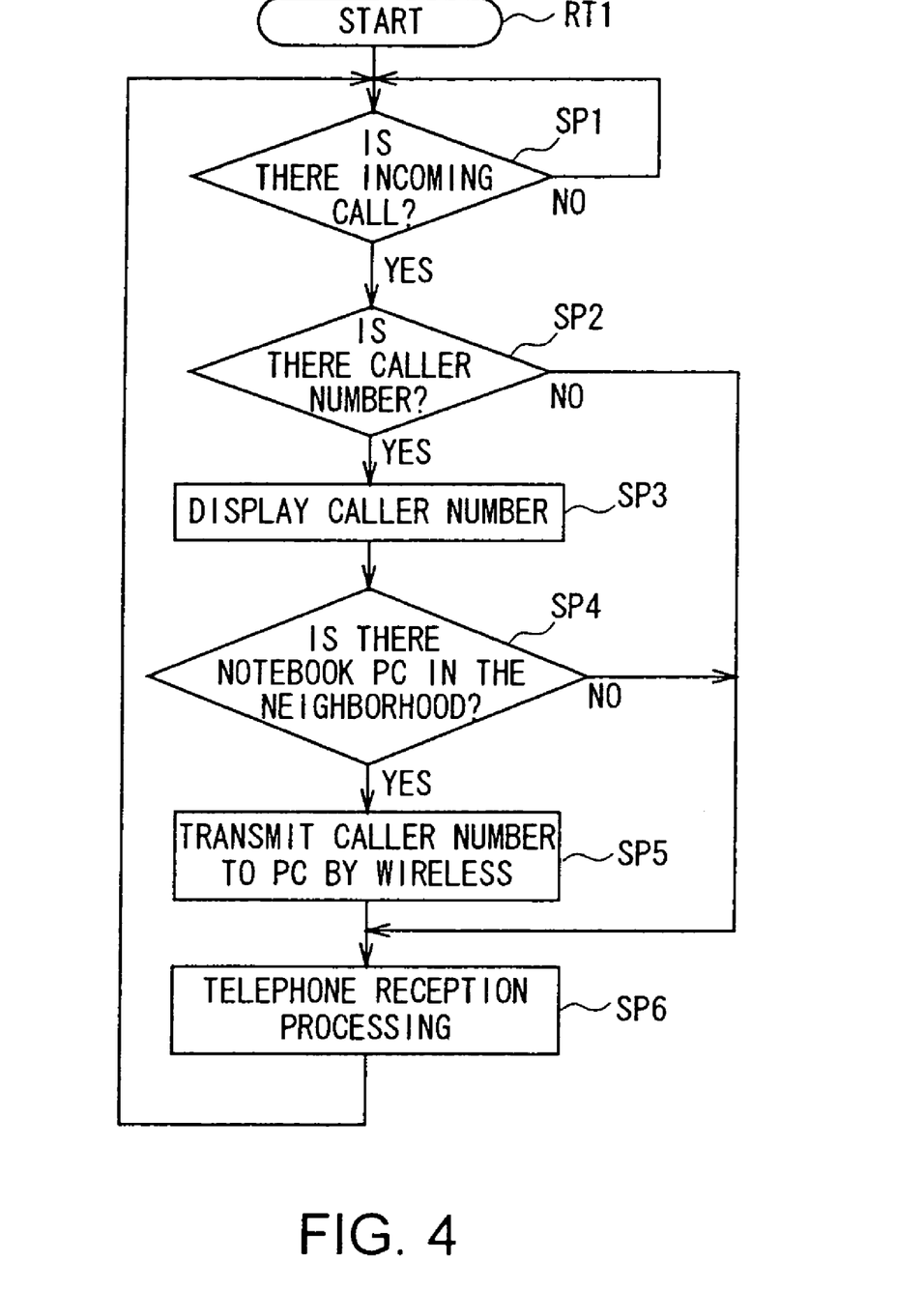
FIG. 4 is a flowchart showing a caller number transmission processing.

More particularly, in the caller number transmission processing shown in FIG. 4, the digital cellular phone 3 enters a starting step of a routine RT1, and continues to step SP1. In step SP1, the CPU 20 makes an inquiry to the signal processing section 23 to determine whether or not there is an incoming signal from the base station 4 (FIG. 1).

If a negative result is obtained in step SP1, this means that there is no incoming signal from the base station 4, and the CPU 20 returns to the starting step. On the other hand, if a positive result is obtained in step SP1, this means that there is an incoming call from the base station 4, and the CPU 20 continues to the following step SP2.

In step SP2, the CPU 20 determines whether or not a caller number is added to the incoming signal from the base station 4.

If the negative result is obtained in step SP2, this means that there is no caller number added to the incoming signal, and the CPU 20 continues to step SP6. On the other hand, if the positive result is obtained in step SP2, this means that there is a caller number added to the incoming signal, and the CPU 20 continues to the following step SP3.

In step SP3, the CPU 20 receives the caller number from the signal processing section 23 and displays it on the display section 21, and continues to the following step SP4.

In step SP4, the CPU 20 makes inquiry to the short-range wireless interface 24 to determine whether or not there is a notebook PC 2 in the vicinity of the digital cellular phone.

If the negative result is obtained in step SP4, this means that there is no notebook PC 2 in the vicinity of the digital cellular phone, and the CPU 20 continues to step SP6. On the other hand, if the positive result is obtained in step SP4, this means that there is a Bluetooth-compliant personal computer in the vicinity of the digital cellular phone, and the CPU 20 continues to the following step SP5.

In step SP5, the CPU 20 controls the short-range wireless interface 24 to transmit the caller number to the notebook PC 2 via the antenna 30, and continues to the following step SP6.

In step SP6, the CPU 20 implements a reception processing, establishes a line between itself and the base station 4 to start the telephone conversation with the caller, and returns to step sp1.

The digital cellular phone 3 is adapted to implement such a caller number transmission processing, and to display and transmit the caller number all the time during operation.

(2-2) Processing in Notebook PC

Figure 5:
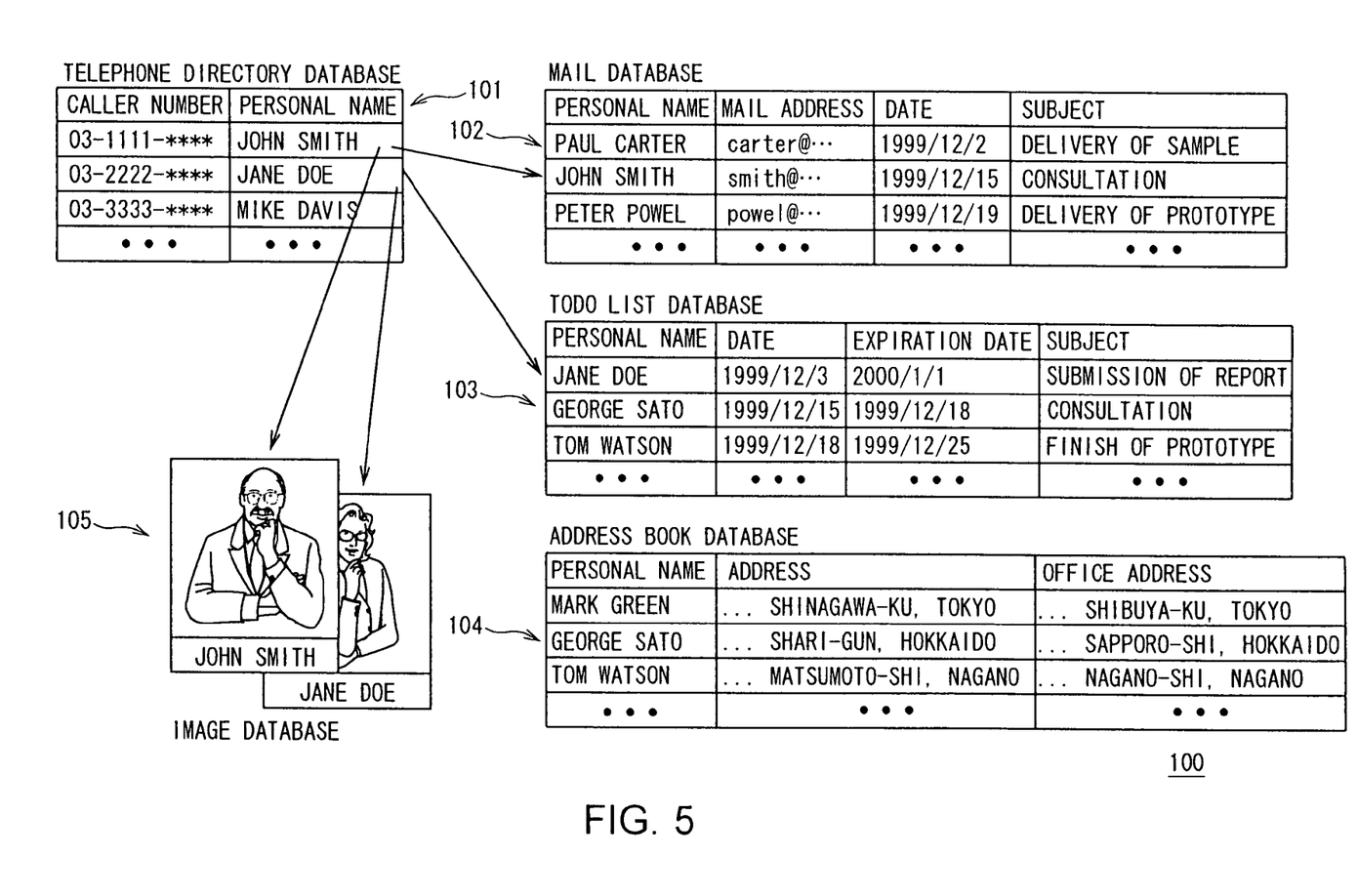
FIG. 5 is a schematic view of a configuration of a personal information database.

In the notebook PC 2 according to the present invention, a personal information database 100 shown in FIG. 5 is stored in the HDD 14.

The personal information database 100 is constituted by a telephone directory database 101 having registered therein the caller numbers and personal names associated with the caller numbers, an electronic mail database 102 having registered therein electronic mail transmission/reception histories for the respective personal names, a ToDo list database 103 having registered therein schedules for the respective personal names, such as deadlines of jobs, an address book database 104 having registered therein addresses or office addresses for the respective personal names, and an image database 105 having registered therein images associated with the respective personal names, such as portraits or card pictures. It is provided that a personal name can be used as a common search key to search across the telephone directory database 101, electronic mail database 102, ToDo list database 103, address book database 104, and image database 105.

The CPU 10 in the notebook PC 2 reads the caller information display program from the HDD 14, and executes the program by deploying it in the RAM 11.

When a caller number is received from the digital cellular phone 3, the CPU 10 obtains a personal name associated with the caller number (that is, a caller name) from the telephone 11 directory database 101 according to the caller information display program.

In addition, the CPU 10 uses this caller name as the search key to search across the electronic mail database 102, ToDo list database 103, address book database 104, and image database 105, and then displays the personal information concerning the caller (that is, the caller information) on the display section 12.

Figure 6:
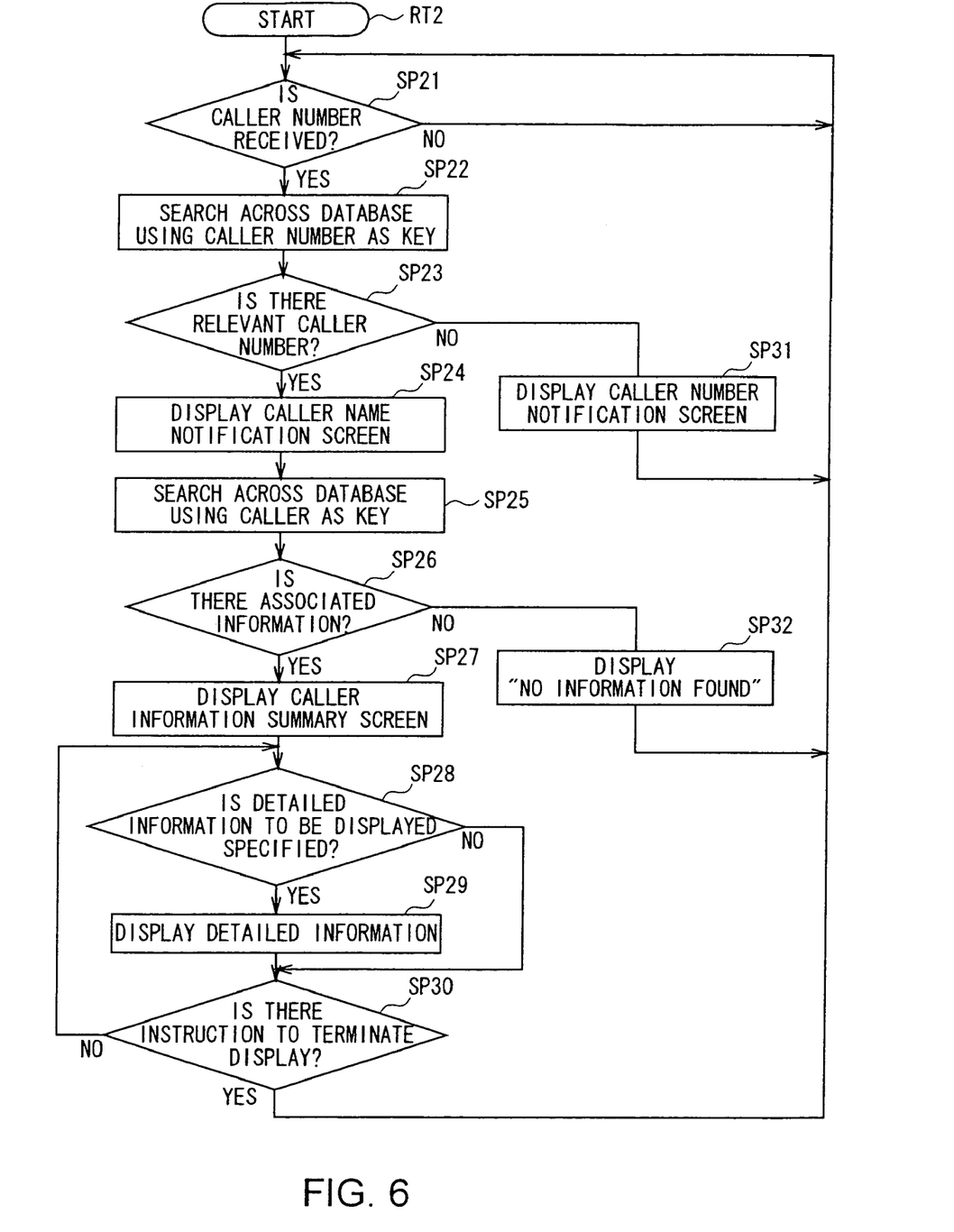
FIG. 6 is a flowchart showing a caller information display processing.

More particularly, as shown in FIG. 6, the notebook PC 2 enters a starting step of a routine RT2, and continues to step SP21. In step SP21, the CPU 10 (FIG. 2) makes an inquiry to the short-range wireless interface 16 to determine whether or not the caller number is received from the digital cellular phone 3 (FIG. 1).

If a negative result is obtained in step SP21, this means that no caller number is received from the digital cellular phone 3, and the CPU 10 returns to step SP21. On the other hand, if a positive result is obtained in step SP21, this means that the caller number is received from the digital cellular phone 3, and the CPU 10 continues to the following step SP22.

In step SP22, the CPU 10 uses the received caller number as the search key to search across the telephone directory database 101, and continues to the following step SP23.

In step SP23, the CPU 10 determines whether or not the personal name associated with the received caller number is registered in the telephone directory database 101.

Figure 7:
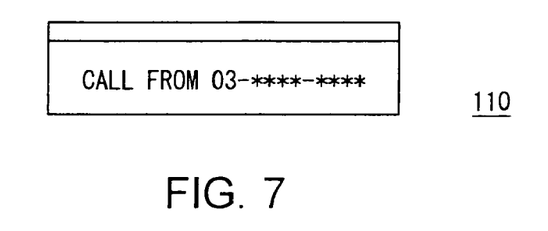
FIG. 7 is a schematic view of a caller number notification screen.

If the negative result is obtained in step SP23, this means that the personal name associated with the received caller number is not registered in the telephone directory database 101, and the CPU 10 continues to step SP31. In step SP 31, the CPU 10, based on the received caller number, displays the caller number notification screen 110 shown in FIG. 7 on the display section 12 to notify the user of the incoming call to the digital cellular phone 3 and the caller number for the incoming call, and then returns to step SP1.

On the other hand, if the positive result is obtained in step SP23, this means that the personal name associated with the received caller number is registered in the telephone directory database 101, and the CPU 10 continues to step SP24.

Figure 8:
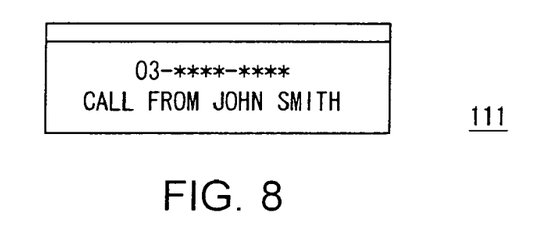
FIG. 8 is a schematic view of a caller name notification screen.

In step SP24, the CPU 10 displays the caller name notification screen 111 shown in FIG. 8 on the display section 12 to notify the user of the incoming call to the digital cellular phone 3, the caller number for the incoming call, and the personal name associated with the caller number (that is, the caller name), and then continues to the following step SP25.

In step SP25, the CPU 10 uses the caller name as the search key to search across the electronic mail database 102, ToDo list database 103, address book database 104, and image database 105, and then continues to the following step SP26. By the way, in the notebook PC 2, the databases to be searched across in such a search process may be specified in advance.

In step SP26, based on the search result in step SP25, the CPU 10 determines whether or not the personal information concerning the caller is included in the electronic mail database 102, ToDo list database 103, address book database 104, and image database 105.

If a negative result is obtained in step SP26, this means that no personal information concerning the caller is included in the electronic mail database 102, ToDo list database 103, address book database 104, and image database 105, and the CPU 10 continues to step SP32, displays a comment text "no information found" on the display section 12, and then returns to step SP21. On the other hand, if a positive result is obtained in step SP26, this means that the personal information concerning the caller (that is, the caller information) is included in the electronic mail database 102, ToDo list database 103, address book database 104, or image database 105, and the CPU 10 continues to the following step SP27.

In step SP27, based on the search result in step SP25, the CPU 10 displays the caller information summary screen 112 (FIG. 9) representing the summary of the search result on the display section 12.

Figure 9:
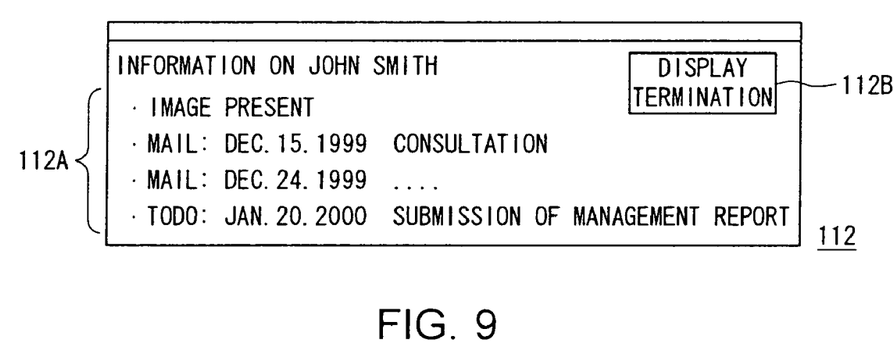
FIG. 9 is a schematic view of a caller information summary screen.

In the caller information summary screen 112, a content summary of the caller information 112A (a title or reception/transmission date and time of a mail, a title and deadline of an item in the ToDo list, presence of images, and the like) is displayed, and it is provided that the user can specify the detailed information to be displayed for the content summary 112A (a text of a mail or item in the ToDo list, images, or the like) by clicking a desired item in the summary 112A with the touch pad 17 (FIG. 2). Furthermore, it is provided that display of the caller information summary screen 112 can be terminated by clicking a display termination button 112B with the touch pad 17 in the caller information summary screen 112.

In step SP28, the CPU 10 determines whether or not the detailed information to be displayed is specified in the caller information summary screen 112.

If a negative result is obtained in step SP28, this means that the detailed information to be displayed is not specified in the caller information summary screen 112, and the CPU 10 continues to step SP30. On the other hand, if a positive result is obtained in step SP28, this means that the detailed information to be displayed is specified in the caller information summary screen 112, and the CPU 10 continues to the following step SP29.

Figure 10:
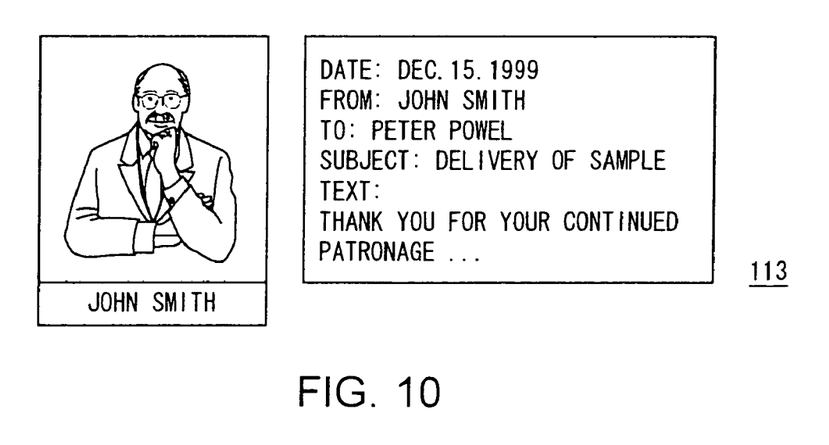
FIG. 10 is a schematic view of a detailed caller information screen.

In step SP29, the CPU 10 obtains the detailed information concerning the item specified to be displayed from the personal information database 100, displays the detailed information in the form of the caller information display screen 113 shown in FIG. 10 on the display section 12, and then continues to the following step SP30.

In step SP30, the CPU 10 determines whether or not the display termination button 112B is clicked in the caller information summary screen 112.

If a negative result is obtained in step SP30, this means that the display termination button 112B is not clicked in the caller information summary screen 112, and that there is no instruction to terminate display of the caller information summary screen 112, and the CPU 10 returns to step SP28. On the other hand, if a positive result is obtained in step SP30, this means that the display termination button 112B is clicked in the caller information summary screen 112, and that there is the instruction to terminate display of the caller information summary screen 112, and the CPU 10 returns to step SP21.

In this way, the notebook PC 2 can retrieve the caller information on the incoming call to the digital cellular phone 3 from the personal information database 100 and display the caller information on the display section 12, thereby providing the caller information to the user.

(3) Embodiment Operation and Effect

In the above-mentioned configuration, when the digital cellular phone 3 receives the incoming signal, in response to the reception, it transmits the caller number for the incoming signal to the notebook PC 2 via the short-range wireless interfaces 24 and 16 before the reception processing.

The notebook PC 2 searches across the telephone directory database 101 based on the caller number transmitted from the digital cellular phone 3 to obtain the caller name associated with the caller number. Then, the notebook PC 2 uses the caller name as the search key to search across the electronic mail database 102, ToDo list database 103, address book database 104, and image database 105, and display the caller information for the caller on the caller information summary screen 112 and caller information display screen 113.

In this way, the information processing system 1 can provide the user with the caller number for the incoming call to the digital cellular phone 3, as well as the caller information stored in the personal information database 100 via the notebook PC 2.

In this way, since the notebook PC 2 displays the caller information immediately after the digital cellular phone 3 receives an incoming call, the user can obtain the caller information via the caller information summary screen 112 and caller information display screen 113 before the telephone conversation is started, so that he/she can smoothly talk to the caller during the telephone conversation.

Furthermore, according to the information processing system 1, by transmitting the caller number from the digital cellular phone 3 to the notebook PC 2 via the short-range wireless interface 24 and 16, the user can be informed of the incoming call to the digital cellular phone 3 by the notebook PC 2, even if the digital cellular phone 3 is away from but within about 10 meters of the notebook PC 2.

According to the above-mentioned configuration, the information processing system 1 is configured to interconnect by wireless the digital cellular phone 3 and the notebook PC 2 via the short-range wireless interface 24 and 16, transmit the caller number for the incoming call to the digital cellular phone 3 to the notebook PC 2, and search across the personal information database 100 using the caller number as the search key to display the caller information, thereby being capable of allowing the user to know the caller information before starting the telephone conversation.

Furthermore, since the information processing system 1 is configured to transmit the caller number from the digital cellular phone 3 to the notebook PC 2 via the short-range wireless interfaces 24 and 16, the caller information can be easily displayed at the notebook PC 2 without interconnecting the digital cellular phone 3 and the notebook PC 2 by a cable and the like.

(4) Other Embodiments

While the short-range wireless interface compliant with the Bluetooth is used as communication means between the digital cellular phone 3 and the notebook PC 2 in the above-mentioned embodiment, the present invention is not limited to this embodiment, and various types of communication means, such as a short-range radio communication, for example HomeRF defined in the Institute of Electrical and Electronics Engineers (IEEE) 802, or an infrared communication of the Infrared Data Association (IrDA) standard, can be used to interconnect the digital cellular phone 3 and the notebook PC 2, and moreover, an cable interface such as Universal Serial Bus (USB) can be used to interconnect the digital cellular phone 3 and the notebook PC 2.

Furthermore, while the caller number for the incoming call to the digital cellular phone 3 is transmitted to the notebook PC 2, and the caller information is displayed on at the notebook PC 2 in the above-mentioned embodiment, the present invention is not limited to this embodiment, and the caller number can be transmitted to, for example, a desktop personal computer, or portable information equipment such as a Personal Digital Assistant (PDA), to display the caller information.

Furthermore, while the caller number for the incoming call to the digital cellular phone 3 is transmitted to the notebook PC 2, and the caller information is displayed at the notebook PC 2 in the above-mentioned embodiment, the present invention is not limited to this embodiment, and the caller number for the incoming call to a wire telephone, for example, can be transmitted to the notebook PC 2, and the caller information can be displayed at the notebook PC 2.

Furthermore, while the CDMA cellular phone is used as the digital cellular phone 3 in the above-mentioned embodiment, the present invention is not limited to this embodiment, and the WCDMA (Wideband-CDMA) or Time Division Multiple Access (TDMA) can be utilized, and moreover, the International Mobile Telecommunication System (IMT)-2000, which is the next generation cellular phone system, can be utilized.

Furthermore, while the CPU 10 in the notebook PC 2 searches the caller information for the caller calling the digital cellular phone 3 according to the caller information display program stored in advance in the HDD 14 in the above-mentioned embodiment, the present invention is not limited to this embodiment, the caller information display program can be stored in various types of program storage media, and the caller information display program can be installed in the notebook PC 2 from the program storage medium to display the caller information.

In this way, the above-mentioned program storage medium for enabling the caller information display program to be installed in the notebook PC 2 and executed by the notebook PC 2 can be provided as a package medium such as a floppy disk, Digital Versatile Disc-Read Only Memory (DVD-ROM), as well as a semiconductor memory or magnetic disk which can temporarily or permanently store the program. Furthermore, a cable or wireless communication medium, such as a local area network, Internet, or digital satellite broadcasting, can be used as means for storing the caller information display program in the program storage medium, and the caller information display program can be stored in the program storage medium via various interfaces, such as router, or modem.

As described above, according to the present invention, a caller number for an incoming call to a telephone set is transmitted to an information processing apparatus, and information concerning a caller having originated the incoming call is read from storage means to be displayed, so that an user can be provided with various kinds of information concerning the caller before the user responds to the incoming call.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An information processing system comprising:

a digital cellular telephone set including a wireless communication link and a cellular network communication link, the wireless communication link being a shorter-range communication link than the cellular network communication link, the digital cellular telephone configured to transmit via the wireless communication link a caller number specific to a caller, said caller number previously added to an incoming wireless signal via the cellular network communication link from a base station; and an information processing apparatus configured to receive said caller number transmitted by said digital cellular telephone set via the wireless communication link, configured to read personal information on said caller associated with said caller number from a storage means, and configured to display the information.

2. An information processing apparatus comprising:

receiving means for receiving via a wireless communication link a caller number specific to a caller previously added to an incoming signal arriving at a called-station digital cellular telephone set from a caller-station digital cellular telephone set via a cellular network communication interface operating with a cellular network communication link, the wireless communication link being a shorter-range communication link than the cellular network communication link;

storage means for storing personal information on said caller associated with said caller number; and read and display means for reading said personal information associated with said caller number from said storage means and displaying the personal information.

3. An information processing method comprising:

receiving at an information processing apparatus via a wireless communication link a caller number specific to a caller previously added to an incoming wireless signal arriving at a called-station digital cellular telephone set from a caller-station digital cellular telephone set via a cellular network communication interface operating with a cellular network communication link, the wireless communication link being a shorter-range communication link than the cellular network communication link;

reading, from storage means for storing personal information on said caller associated with said caller number, said personal information associated with said received caller number; and displaying the personal information.

4. A program storage medium which causes an information processing apparatus to execute a program, said program comprising:

receiving via a wireless communication link a caller number specific to a caller previously added to an incoming signal arriving at a digital cellular telephone set from the digital cellular telephone set via a cellular network communication interface operating with a cellular network communication link, the wireless communication link being a shorter-range communication link than the cellular network communication link;

reading, from storage means for storing personal information on said caller associated with said received caller number, said personal information associated with said caller number; and displaying the personal information.

5. A digital cellular telephone set comprising:

detecting means for detecting a caller number previously added to a transmitted incoming wireless signal via a cellular network communication interface from a base station; and transmitting means for transmitting via a wireless communication link said caller number to an information processing apparatus which reads from a storage means and displays personal information on a caller associated with said caller number operating with a cellular network communication link, the wireless communication link being a shorter-range communication link than the cellular network communication link.

6. An information processing method comprising:
- detecting a caller number previously added to a transmitted incoming signal from a base station via a cellular network communication interface; and
- transmitting said caller number via a wireless communication link to an information processing apparatus which reads from a storage means and displays personal information on a caller associated with said caller number operating with a cellular network communication link, the wireless communication link being a shorter-range communication link than the cellular network communication link.

7. A program storage medium comprising the steps of:
- detecting a caller number previously added to a transmitted incoming signal from a base station via a cellular network communication interface; and
- transmitting said caller number via a wireless communication link to an information processing apparatus which reads from a storage means and displays personal information on a caller associated with said caller number operating with a cellular network communication link, the wireless communication link being a shorter-range communication link than the cellular network communication link;
- wherein a summary of said personal information based on an electronic mail database is displayed, and detailed information associated with one or more items in said summary is displayed when said one or more items in said summary is selected.

8. The information processing system according to claim 1, wherein said wireless communication link is a BLUETOOTH interface and said information processing apparatus is a personal computer (PC).

9. The information processing method according to claim 3, wherein said wireless communication link is a BLUETOOTH interface and said information processing apparatus is a personal computer (PC).

10. The information processing system according to claim 1, wherein:
- the information processing apparatus is further configured to display a summary of said personal information based on an electronic mail database, and is configured to display detailed information associated with at least one item in said summary when said at least one item in said summary is selected.

11. The information processing apparatus according to claim 2, wherein:
- the read and display means are further displaying a summary of said personal information based on an electronic mail database, and are displaying detailed information associated with at least one item in said summary, when said at least one item in said summary is selected.

12. The information processing method according to claim 3, wherein the displaying further comprises:
- displaying a summary of said personal information based on an electronic mail database, and after selecting at least one item in said summary, displaying detailed information associated with the at least one item in said summary.

13. The program storage medium according to claim 4, wherein the displaying further comprises:
- displaying a summary of said personal information based on an electronic mail database, and after selecting at least one item in said summary, displaying detailed information associated with the at least one item in said summary.

14. The digital cellular telephone set according to claim 5, further comprising:
- displaying means for displaying a summary of said personal information based on an electronic mail database, and for displaying detailed information associated with at least one item in said summary, when said at least one item in said summary is selected.

15. The information processing method according to claim 6, further comprising:
- displaying a summary of said personal information based on an electronic mail database, and displaying, after selecting at least one item in said summary, detailed information associated with the at least one item in said summary.

16. The program storage medium according to claim 7, further comprising:
- displaying a summary of said personal information based on an electronic mail database, and displaying, after selecting at least one item in said summary, detailed information associated with the at least one item in said summary.

* * * * *